United States Patent
Akhan et al.

(10) Patent No.: US 6,947,486 B2
(45) Date of Patent: Sep. 20, 2005

(54) METHOD AND SYSTEM FOR A HIGHLY EFFICIENT LOW BIT RATE VIDEO CODEC

(75) Inventors: Mehmet Bilgay Akhan, Egham (GB); Gozde Bozdagi Akar, Ankara (TK); Anil Aksay, Guildford (GB); Alptekin Temizel, Guildford (GB); Yavuz Ahiska, Esher (GB)

(73) Assignee: Visioprime, Woking (GB)

( * ) Notice: Subject to any disclaimer, the term of this patent is extended or adjusted under 35 U.S.C. 154(b) by 526 days.

(21) Appl. No.: 10/106,424

(22) Filed: Mar. 25, 2002

(65) Prior Publication Data

US 2002/0136304 A1 Sep. 26, 2002

Related U.S. Application Data

(60) Provisional application No. 60/278,513, filed on Mar. 23, 2001.

(51) Int. Cl.[7] .................................................. H04N 7/12
(52) U.S. Cl. .................................................. 375/240.16
(58) Field of Search ................................ 348/416, 402, 348/699, 411, 390, 390.1; 375/240.16, 240.12, 240.19, 240.24; 382/251, 234, 239

(56) References Cited

U.S. PATENT DOCUMENTS

| | | | | |
|---|---|---|---|---|
| 5,214,507 A | * | 5/1993 | Aravind et al. | 348/390.1 |
| 5,477,272 A | * | 12/1995 | Zhang et al. | 375/240.06 |
| 5,953,460 A | * | 9/1999 | Wu | 382/239 |
| 6,381,280 B1 | * | 4/2002 | Lynch et al. | 375/140.19 |
| 6,553,071 B1 | * | 4/2003 | Kim et al. | 375/240.19 |

* cited by examiner

Primary Examiner—Chris Kelley
Assistant Examiner—Behrooz Senfi
(74) Attorney, Agent, or Firm—Sawyer Law Group LLP

(57) ABSTRACT

A system and a method for wavelet-based low bitrate video coding is provided. The system and method of this invention processes each frame of a video sequence based on its content. The discrete wavelet transform of each frame is taken separately. If the difference between the contents of a first frame and a second frame is above a threshold, then the wavelet transformed second frame is quantized and lossless encoded. If the difference is less than a threshold, then motion estimation is employed in wavelet domain. Then the difference between the wavelet transformed second frame and the motion compensated wavelet transformed second frame is quantized and lossless encoded. The quantization is applied by using dynamic adjustment. The quantization tables are optimized based on the coded frame characteristics. In addition to the coded frames, the lossless coded motion vectors are also transmitted to the decoder unit. To improve the quality of the coded video sequence another decision criteria is used at the feedback loop of this invention. The coded second frame is decoded and compared with the original second frame. If the difference between the two frames is above a threshold, then the wavelet transformed second frame is quantized and lossless encoded instead of the motion compensated second frame.

4 Claims, 7 Drawing Sheets

$$MV_2(x,y) = MV_3(2*x\pm1, 2*y\pm1)$$
$$MV_1(x,y) = MV_2(2*x\pm1, 2*y\pm1)$$

$MV_1(x,y)$ Vector computed location of block $RL_1(x,y)$ Real Location of block Error $e_1(x,y) = MV_1(x,y) - RL_1(x,y)$ $\tau$ Threshold Error $e_1(x,y) \geq \tau$ Send as Intra Error $e_1(x,y) < \tau$ Send the vectors and the difference

METHOD AND SYSTEM FOR A HIGHLY EFFICIENT LOW BIT RATE VIDEO CODEC

CROSS-REFERENCE TO RELATED APPLICATION

This application is claiming under 35 USC 119(e) the benefit of provisional patent application Ser. No. 60/278,513 filed on Mar. 23, 2001.

FIELD OF THE INVENTION

The present invention relates to a video compressing technique and, more particularly, to a subband coding method.

BACKGROUND OF THE INVENTION

It is well known that a wavelet transform provides superior performance when performing image and video processing. Wavelet transform avoids blocking effect and mosquito effect, since the transform is taken on the whole image. U.S. Pat. No. 5,563,960 shows that this approach is better than a DCT transform. However, although this patent describes taking spatial redundancy into account, an image and video order processing system which incorporates the description of this patent still requires processing power due to temporal redundancy. In previous systems, a variable-block size multi-resolution motion estimation scheme is proposed reducing the temporal redundancy. This also requires additional processing power. For real-time application the speed of the algorithm is much more important than the accuracy of the motion estimation.

Accordingly, what is needed is a system and method for providing a low bit rate video coding. The method and system should be compatible with existing video processing system, cost effective and easily implementable. The present invention addresses such a need.

SUMMARY OF THE INVENTION

A system and a method for wavelet-based low bit rate video coding is provided. The system and method in accordance with the present invention processes each frame of a video sequence based on its content. The discrete wavelet transform of each frame is taken separately. Then the difference between these two frames are calculated. If the difference between the contents of the first frame and the second frame is above a threshold, then the wavelet transformed second frame is quantized and coded with a lossless coding method (Such as a run-length coder followed by a Huffman encoder or an arithmetic coder). If the difference is less than a threshold, then motion estimation is employed in wavelet domain. Then the difference between the wavelet transformed second frame and the motion compensated wavelet transformed second frame is quantized and coded with a lossless coding method. The quantization is applied by using dynamic adjustment. The quantization tables are optimized based on the coded frame characteristics. In addition to the coded frames, the lossless coded motion vectors are also transmitted to the decoder unit. To improve the quality of the coded video sequence another decision criteria is used at the feedback loop. The coded second frame is decoded and compared with the original second frame. If the difference between the two frames is above a threshold, then the wavelet transformed second frame is quantized and lossless coded instead of the motion compensated second frame.

A system and method in accordance with the present invention uses fixed block sizes and fixed refinement of motion vectors, which inevitably reduces processing power requirements. Also in the scheme of video coding, quantization is very important especially in high-efficiency coding. Quantization affects the quality of the reconstructed frames in the feedback loop, which affects the motion estimation as well. The dynamic adjusted quantization scheme in accordance with the present invention also improves the quality and efficiency of coding. Previous art also shows that estimating motion in transform domain, can give us opportunity to make processing such as watermarking easily after coding of the video, without using inverse transforms. Since the motion estimation is within in transform domain, our scheme also has this capability.

Therefore, to utilize the advantages of the wavelet transform and reduce processing complexity, a system and method in accordance with the invention employs hierarchical motion estimation in the wavelet domain. The motion estimate of each scale is often used as a starting point for the higher scale. After the compensation, the energy of the diagonal quarter is used as a fall back decision mechanism. If the energy is above a threshold then the system automatically sends the original image instead of the difference image.

DETAILED DESCRIPTION

The present invention relates to a video compressing technique and, more particularly, to a subband coding method. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention uses fixed block sizes and fixed refinement of motion vectors, which inevitably reduces processing power requirements. Also in the scheme of video coding, quantization is very important especially in high-efficiency coding. Quantization affects the quality of the reconstructed frames in the feedback loop, which affects the motion estimation as well. The dynamic adjusted quantization scheme in accordance with the present invention also improves the quality and efficiency of coding. Previous art also shows that estimating motion in transform domain, can give us opportunity to make processing such as watermarking easily after coding of the video, without using inverse transforms. Since the motion estimation is within in transform domain, our scheme also has this capability.

Therefore, to utilize the advantages of the wavelet transform and reduce processing complexity, a system and method in accordance with the invention employs hierarchical motion estimation in the wavelet domain. The motion estimate of each scale is often used as a starting point for the higher scale. After the compensation, the energy of the diagonal quarter is used as a fall back decision mechanism. If the energy is above a threshold then the system automatically sends the original image instead of the difference image.

Figure 1:
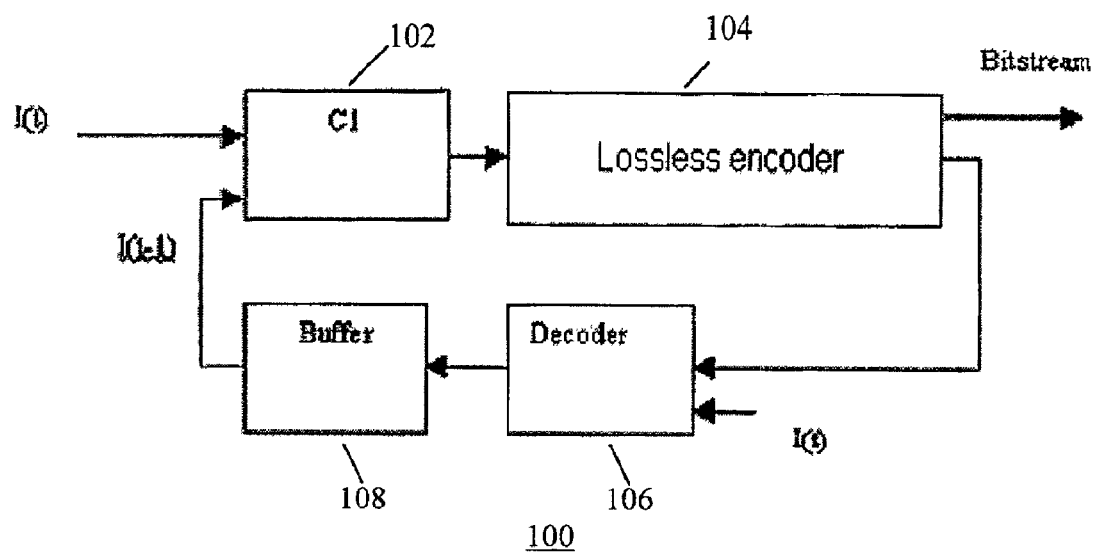
FIG. 1 is a block diagram of the complete coder design.

To describe the features of the present invention in more detail, refer now to the following description in conjunction with the accompanying figures. FIG. 1 is a block diagram of the complete coder 100. The coder 100 processes each frame of a video sequence based on its content. First, in the motion estimator block 102, the discrete wavelet transform of each frame is taken separately. Then the difference between these two frames are calculated. If the difference between the contents of the first frame and the second frame is above a threshold based upon the block 102, then the wavelet transformed second frame is quantized and lossless encoding is applied by the lossless encoder 104. If the difference is less than a threshold, then motion estimation is employed in wavelet domain. Then the difference between the wavelet transformed second frame and the motion compensated wavelet transformed second frame is quantized and lossless encoded again by the lossless encoder 104. The quantization is applied by using dynamic adjustment. The quantization tables are optimized based on the coded frame characteristics. In addition to the coded frames, the lossless coded motion vectors are also transmitted to the decoder unit. To improve the quality of the coded video sequence another decision criteria is used at the feedback loop. The coded second frame is decoded and compared with the original second frame by the decoder 106 and then provided to buffer 108. If the difference between the two frames is above a threshold, then the wavelet transformed second frame is quantized, lossless encoded instead of the motion compensated second frame.

Figure 2:
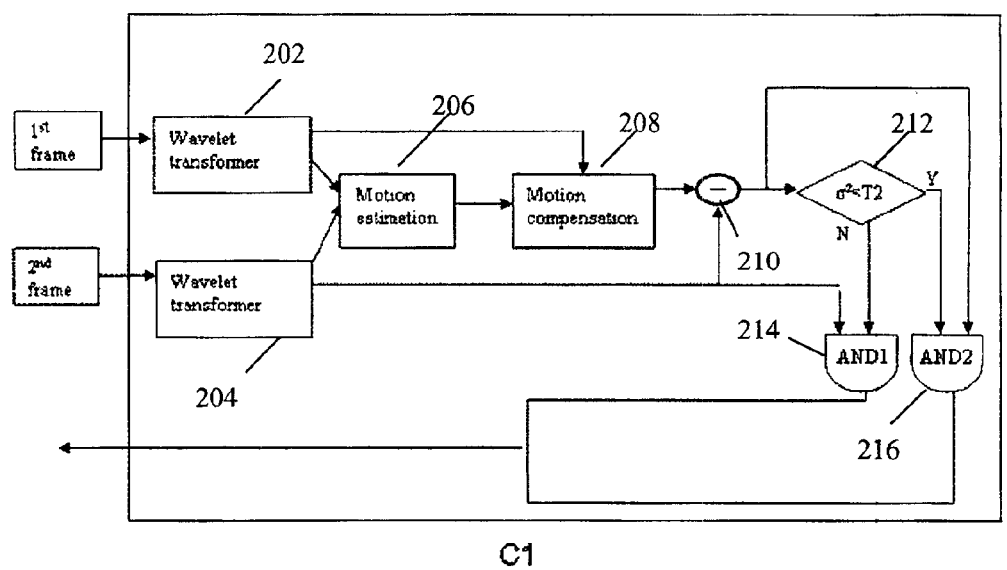
FIG. 2 is a motion estimator block.

A key feature of the present invention is the motion estimator block 102. It will be described in detail herein below. FIG. 2 is a motion estimator block 102. The motion estimator block 102 operates in the following manner. The wavelet transformer blocks 202 and 204 take the wavelet transform of both the frames respectively. The motion estimation block 206 calculates the motion vectors as explained in detail in the next section. The motion compensation block 208 generates the image using the calculated motion vectors. The subtractor 210 calculates the difference between the wavelet transformed original image and the image created using motion compensation to calculate the motion estimation error. The decision block 212 finds if the error is above a threshold. If it is above a threshold the second input to AND1 block 214 is 1 while the first input to AND2 block 216 is 0, so wavelet transformed $2^{nd}$ frame is selected for coding. Similarly, if it is below a threshold, motion estimation is used for coding.

Figure 3:
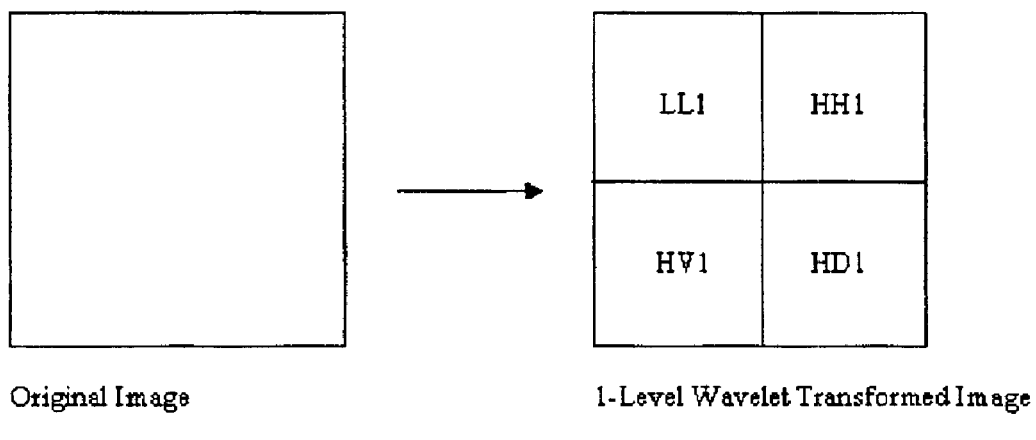
FIG. 3 illustrates a 1-level wavelet transform of an image.

FIG. 3 illustrates a 1-Level wavelet transform of an image. The wavelet transform subsamples the image. As shown in FIG. 3, a 1-level of wavelet transform creates 4 subsampled separate quarters, containing different sorts information about the image. Further transforms are performed on the LL section of the transforms.

Figure 4:
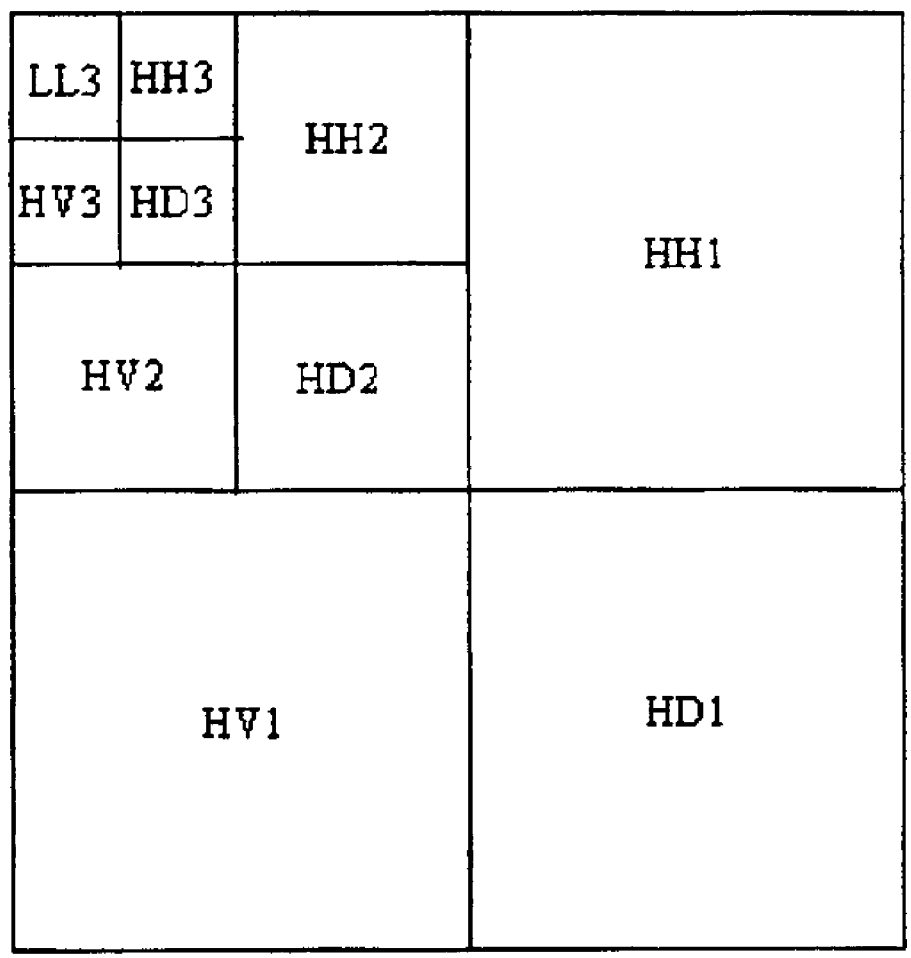
FIG. 4 illustrates a 3-level wavelet transform.
Figure 5:
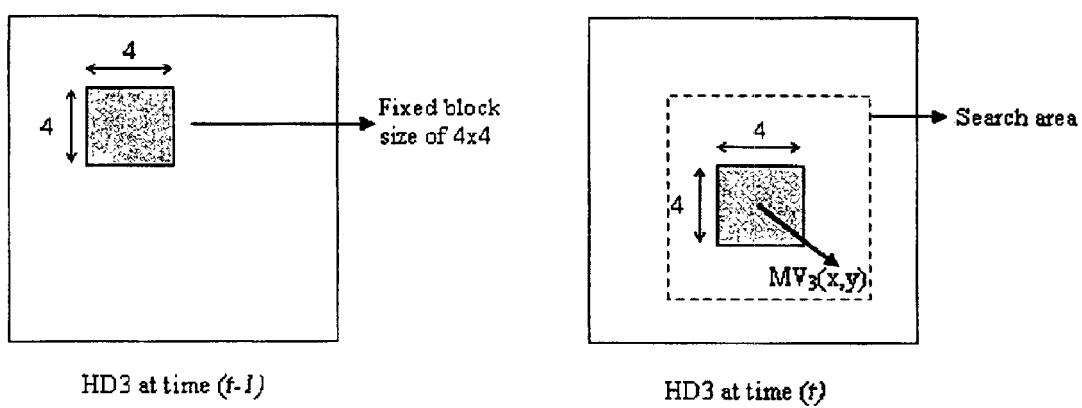
FIG. 5 illustrates a motion vector computations for a fixed size block at lowest level.

FIG. 4 illustrates a 3-level wavelet transform. Motion vectors are calculated at each quarter of the lowest level for a fixed size block. In this example, block size at level 3 is taken to be 4×4. FIG. 5 illustrates a motion vector computation for a fixed size block at lowest level. Once a block is chosen for a frame at (t−1), then a fixed area of N×(4×4) where N is chosen by experimentation is searched for the motion of the block at time (t). In our implementation, a fixed area of 9×(4×4) has given good results. If the size of motion vector is smaller than a predefined size of $MVT_3$ (a,b), this is taken to mean that there is insignificant difference between the blocks and this is realized as no motion. However, if the motion vector is bigger than the threshold, then it needs to be refined at higher levels. All search blocks are 4×4 in all hierarchies. So a 4×4 search block in HD3 corresponds to 4 blocks of size 4×4 in HD2.

The ideal block size selected should be proportional to the whole image size. In this particular case, for an image size of 720×576 pixels, the ideal block size is found to be 4×4 pixels in the lowest level. This corresponds to 32×32 at the highest level. Different images will require different block sizes. A satisfactory fixed size can be found for different image sizes.

Choice of a bigger block size such as 32×32 at the lowest level may not be able to catch individual motions. Choice of a smaller block size will have a different problem. Consider a block size of 2×2; motion detected in this small block size may not be the dominant motion. It is highly likely that it is noise.

Figure 6:
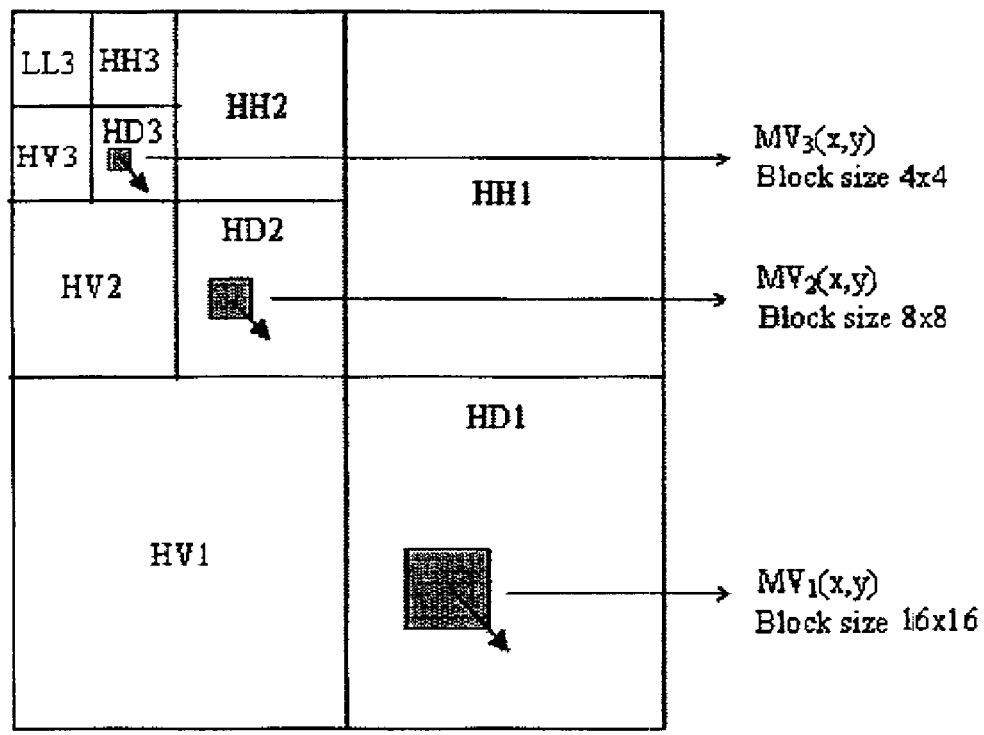
FIG. 6 illustrates a motion vector refinement with fixed refinement limits.

Therefore, the selection of the appropriate block size is an important parameter. The ideal block size needs to be selected using the following parameters:

desired quality required bandwidth desired accuracy of motion estimation required code size required execution speed required memory size In our case, a 4×4 block was found to be satisfactory. The important point here is not the actual fixed size but the idea of using fixed block sizes. The advantages of using fixed block sizes for motion vector calculation are:

reduces computational complexity increases execution speed reduces code size and memory usage FIG. 6 illustrates that the motion vector is refined at each level by fixed amounts of (±1) in each direction. By only fixing by the amount of refinement at each level, the computational speed of the algorithm is increased. However, in some cases, depending on the information in the scene and the speed of movement, the error corresponding to motion vectors also increases. Although this is a drawback this is acceptable to gain speed in both compression and decompression. Additionally, ±1 regularity of refinement increases compression because this approach decreases the motion vector information. Only the refinement factors are sent instead of entire motion vector data.

Figure 7:
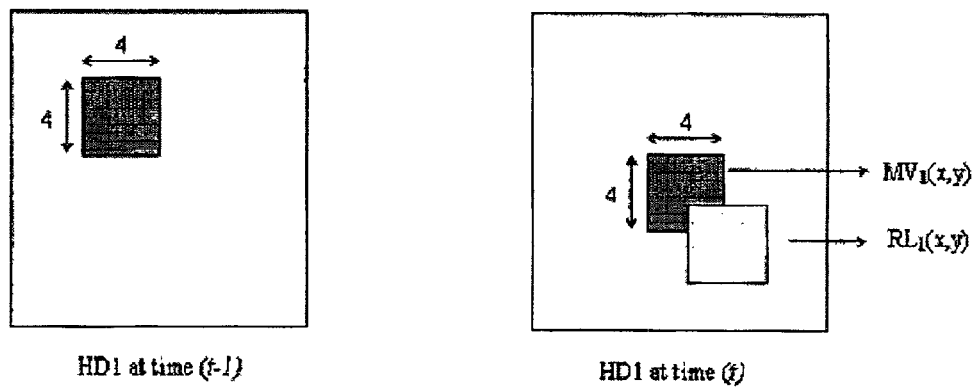
FIG. 7 illustrates an error computation of real and motion vector calculated block locations.

There are several check locations in the coding scheme to decide whether the motion is estimated correctly. After quantization, the frame is regenerated from quantized error coefficients and motion vectors. FIG. 7 illustrates an error computation of real and motion vector calculated block locations. In accordance with this figure, then the signal to noise ratio (SNR) is computed with the original image and the regenerated frame. If SNR is below the threshold, motion estimation is not successful; the frame will be coded independently.

A system and method in accordance with the present invention uses fixed block sizes and fixed refinement of motion vectors, which inevitably reduces processing power requirements. Also in the scheme of video coding, quantization is very important especially in high-efficiency coding. Quantization affects the quality of the reconstructed frames in the feedback loop, which affects the motion estimation as well. The dynamic adjusted quantization scheme in accordance with the present invention also improves the quality and efficiency of coding. Previous art also shows that estimating motion in transform domain, can give us opportunity to make processing such as watermarking easily after coding of the video, without using inverse transforms. Since the motion estimation is within in transform domain, our scheme also has this capability.

Therefore, to utilize the advantages of the wavelet transform and reduce processing complexity, a system and method in accordance with the invention employs hierarchical motion estimation in the wavelet domain. The motion estimate of each scale is often used as a starting point for the higher scale. After the compensation, the energy of the diagonal quarter is used as a fall back decision mechanism. If the energy is above a threshold then the system automatically sends the original image instead of the difference image.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for estimating the motion of consecutive frames of data comprising:

a first wavelet transform for receiving a first frame;

a second wavelet transform for receiving a second frame;

a motion estimator for receiving the transformed first frame and the transformed second frame for calculating the motion vectors of the first and second transformed frames;

a motion compensation for generating an image based upon the calculated motion vectors;

a subtractor for receiving the original image from the second transformed frame and the image from the motion detector and calculating the difference between the images to provide a motion estimation error;

a decision block for determining whether the motion estimation error is above a predetermined threshold; and a threshold logic for determining which of the transformed frames is ready for coding based upon the predetermined threshold.

2. The system of claim 1 wherein the threshold logic comprises first and second AND gates.

3. A coding system for compressing consecutive frames of data comprising:

a motion estimator; wherein the motion estimator further comprises a first wavelet transform for receiving a first frame; a second wavelet transform for receiving a second frame; a motion estimator for receiving the transformed first frame and the transformed second frame for calculating the motion vectors of the first and second transformed frames; a motion compensation for generating an image based upon the calculated motion vectors; a subtractor for receiving the original image from the second transformed frame and the image from the motion detector and calculating the difference between the images to provide a motion estimation error; a decision block for determining whether the motion estimation error is above a predetermined threshold; and a threshold logic for determining which of the transformed frames is ready for coding based upon the predetermined threshold;

a first coder coupled to the motion estimator;

a second coder coupled to the first coder which provides a bitstream output;

a decoder coupled to the second coder in feedback relationship; and a buffer coupled to the decoder and to the motion estimator.

4. The coding system of claim 3 wherein the threshold logic comprises first and second AND gates.

* * * * *